United States Patent
Inoue

(10) Patent No.: US 7,587,782 B2
(45) Date of Patent: Sep. 15, 2009

(54) JOINT MEMBER FOR WIPER BLADE AND WIPER BLADE

(75) Inventor: Yuusuke Inoue, Saitama (JP)

(73) Assignee: Nippon Wiper Blade Co., Ltd., Saitama (JP)

( * ) Notice: Subject to any disclaimer, the term of this patent is extended or adjusted under 35 U.S.C. 154(b) by 629 days.

(21) Appl. No.: 10/524,764

(22) PCT Filed: Aug. 13, 2003

(86) PCT No.: PCT/JP03/10307
§ 371 (c)(1),
(2), (4) Date: Feb. 16, 2005

(87) PCT Pub. No.: WO2004/016483
PCT Pub. Date: Feb. 26, 2004

(65) Prior Publication Data
US 2005/0244218 A1  Nov. 3, 2005

(30) Foreign Application Priority Data
Aug. 19, 2002  (JP) ............................... 2002-237849

(51) Int. Cl.
*B60S 1/40* (2006.01)
(52) U.S. Cl. .................................................. 15/250.32
(58) Field of Classification Search .............. 15/250.32, 15/250.351, 250.44, 250.43, 250.31
See application file for complete search history.

(56) References Cited

U.S. PATENT DOCUMENTS

| 4,670,934 A | * | 6/1987 | Epple et al. .............. 15/250.32 |
| 5,145,274 A | | 9/1992 | Schon |

(Continued)

FOREIGN PATENT DOCUMENTS

DE  26 08 605  9/1977

(Continued)

OTHER PUBLICATIONS

Japanese Official Action (in English language) issued Aug. 23, 2007.

*Primary Examiner*—Gary K Graham
(74) *Attorney, Agent, or Firm*—Wenderoth, Lind & Ponack, L.L.P.

(57) ABSTRACT

A joint member capable of easily and firmly joining a wiper arm of various types (mainly the U-hook type) to a wiper blade main-body at low cost. The joint member 20 includes a fitting member 21 which a U-hook portion 11 of a wiper arm 10 fits to, a fixing member 22 which holds the hook portion 11 between the fixing member and the fitting member 21, and a flexible connecting portion 23 which connects a rear end 21B of the fitting member 21 and a rear end 22B of the fixing member 22 together. The fitting member 21 is rotatably mounted on a mounting pin 9 of a wiper blade main-body 1 and the angles of the wiper arm 10 and the wiper blade can be changed appropriately during mounting work. The U-hook portion 11 is held between a front transverse plate 41 of the fixing member 21 and a front end 21A of the fitting member 21. Both side plates 42 and 43 of the fixing member 21 abut against side portions 2B and 2C of the wiper blade main-body 1 so that a vibration between the wiper arm 10 and the wiper blade is prevented.

8 Claims, 17 Drawing Sheets

U.S. PATENT DOCUMENTS

| | | | |
|---|---|---|---|
| 5,289,608 A * | 3/1994 | Kim | 15/250.32 |
| 5,920,950 A | 7/1999 | Young, III et al. | |
| 6,000,093 A | 12/1999 | Charng | |
| 6,263,538 B1 * | 7/2001 | Westermann et al. | 15/250.32 |

FOREIGN PATENT DOCUMENTS

| | | | |
|---|---|---|---|
| DE | 27 09 893 | | 9/1978 |
| DE | 33 31 310 | | 3/1985 |
| DE | 34 16 505 | | 11/1985 |
| DE | 3416505 | * | 11/1985 |
| DE | 39 19 050 | | 12/1990 |
| DE | 199 00 945 | | 7/2000 |
| EP | 0 141 186 | | 5/1985 |
| FR | 2600292 | * | 12/1987 |
| GB | 1 569 374 | | 6/1980 |
| GB | 2156666 | * | 10/1985 |
| GB | 2 348 118 | | 9/2000 |
| JP | 57-47236 | | 3/1982 |
| JP | 58-52853 | | 3/1983 |
| JP | 2557021 | | 12/1997 |
| JP | 11-310110 | | 11/1999 |
| JP | 2001-163188 | | 6/2001 |
| JP | 2002-308063 | | 10/2002 |

* cited by examiner

FIG.5
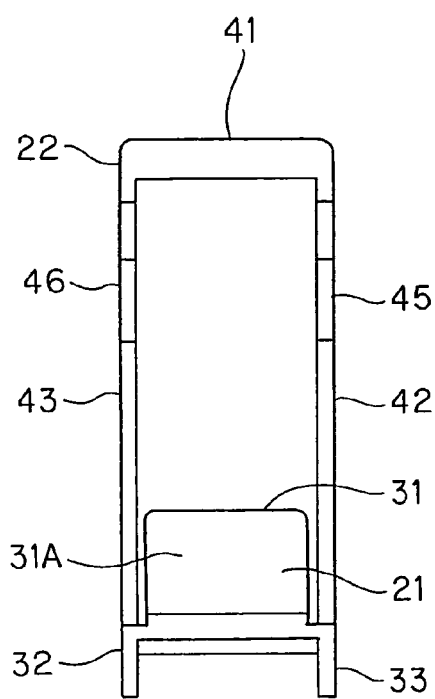
(A)
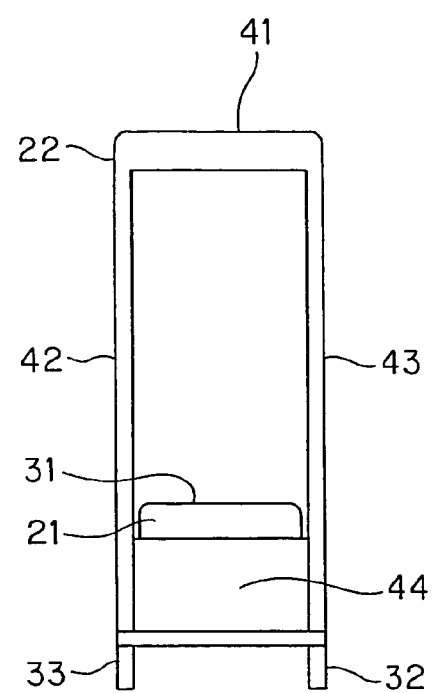
(B)

JOINT MEMBER FOR WIPER BLADE AND WIPER BLADE

FIELD OF THE INVENTION

The present invention relates to a joint member to join a wiper blade to a wiper arm in a wiper system.

DESCRIPTION OF THE RELATED ART

A wiper system which is provided with a wiper blade, a wiper arm and a driving motor is well known in the art. The wiper blade includes a wiper rubber for wiping a surface of an object such as a windshield of a vehicle. The wiper blade is connected to the wiper arm which is linked to a driving motor through a link member. Thus, the driving motor drives the wiper blade through the wiper arm so that the wiper rubber wipes the object.

In such a wiper system, the wiper arm may be connected to the wiper blade through a joint member which is connected to a curved portion (U-hook portion) of the wiper arm. FIGS. 17 to 19 show such joint members of prior art.

As shown in FIGS. 17(A) to 17(D), a joint member 100 includes a fitting portion 101 which fits into a U-hook portion 11 of a wiper arm 10 and a pair of side plates 102 provided on both sides of the fitting portion (only one of the side plates 102 is shown in the figures). A mounting hole 103 is formed in the fitting portion 101 and the side plate 102. The joint member is rotatably connected to a mounting pin 9 of a wiper blade main-body 1 (a portion of the wiper blade other than the joint member) by fitting the mounting pin 9 into the mounting hole 103. Each of the side plates 102 is provided on its front end portion with a protrusion 104 extending inwardly. A gap 105 is formed between the front end of the fitting member 100 and the protrusion 104.

In use, as shown in FIG. 17(A), the joint member 100 is set substantially perpendicular to the wiper blade main body 1. As shown in FIG. 17(B), a U-hook portion 11 of a wiper arm 10 is set substantially parallel to the joint member 100 and then engaged to the front end side of the joint member 100. Thus, the side of the U-hook portion 11 is brought into engagement with the protrusions 104 of the joint member 100 and press the protrusions 104 outwardly so that the side plates 102 is spread outwardly. Accordingly, as shown in FIG. 17(C), the U-hook portion 11 fits into the gap 105 and is held between the front end of the fitting portion 101 and the protrusion 104. As shown in FIG. 17(D), when the wiper arm 10 is rotated to be substantially parallel to the wiper blade 1, the side plate 102 of the joint member 100 is brought into engagement with the main body 1 and prevented from opening outwardly. Thus, the wiper arm 10 is jointed to the wiper blade main-body 1.

As shown in FIGS. 18(A) to 18(D), a joint member 110 includes a cylindrical portion 111 into which a mounting pin 9 of a wiper blade main-body 1 is rotatably fitted, a pair of side plates 112 provided on both sides of the cylindrical portion 111, and a transverse plate 113 which spans across the front ends of the two side plates 112.

In use, as shown in FIG. 18(A), the joint member 110 is arranged substantially perpendicular to the wiper blade main-body 1. As shown in FIG. 18(B), a terminal end 11A of a U-hook portion 11 is inserted into a gap 114 between the cylindrical portion 111 and the transverse plate 113. As shown in FIG. 18(C), the cylindrical portion 111 is fitted into the interior of the U-hook portion 11. When the joint member 110 is rotated to be parallel to the wiper blade 1, a leading end portion 11B of the U-hook portion 11 becomes engaged with the transverse plate 113 so that the U-hook portion 11 is held between the cylindrical portion 111 and the transverse plate 113. Thus, the wiper blade main body of the wiper blade 1 is joined to the wiper arm 10.

As shown in FIGS. 19(A) to 19(C), a joint member 120 includes a main body 121 which is mounted on a wiper blade main-body 1 and a holding member 122 rotatably attached to an area near the front end of the main body 121. The main body 121 is provided with a fitting member 121A against which a U-hook 11 of a wiper arm 10 fits and a mounting hole 121B to be mounted to a mounting pin 9 of a wiper blade main-body 1. The holding member 122 includes a holding plate 122A to hold the U-hook portion 11 between the holding member 122 and the fitting portion 121A.

In use, as shown in FIG. 19(A), the holding member 122 is set substantially perpendicular to the wiper blade main-body 1 and the joint member main-body 121. As shown in FIG. 19(B), the hook portion 11 of the wiper arm 10 is fitted to the front of the fitting member 121A. As shown in FIG. 19(C), when the holding member 122 is rotated, the U-hook portion 11 is sandwiched between the leading end of the fitting member 121A and the holding plate 122A so that the wiper arm 10 is joined to the wiper blade main-body 1.

However, these conventional joint members have drawbacks as follows.

In the joint member 100 of FIGS. 17(A) to 17(D), because the mounting and demounting of the U-hook portion 11 to and from the joint member 100 is performed by the outward opening of the side plate 105, to avoid detaching of the wiper arm 10 from the joint member 100 and the wiper blade main-body 1, the side plate 105 must remain to abut against the wiper blade main-body 1 so that the side plate 105 is not spread outwardly. Thus, in the joining work of the wiper arm 10, the wiper arm 10 and the joint member 100 need to rotate at a large angle (about 90 degrees) with respect to the wiper blade main-body 1. However, some vehicles have a construction that the wiper arm 10 cannot to rotate with respect to the wiper blade main-body 1 at such a large angle so that the joint member 100 cannot be applied to such vehicles. Further, the protrusion 104 which holds the U-hook portion 11 is apt to cause shearing deformation due to shocks and the like so that the U-hook portion 11 may become detached from the joint member 100.

In the joint member 110 of FIGS. 18(A) to 18(D), during the joining of the U-hook portion 11 to the joint member 110, U-hook portion 11 must be inserted into the gap 114 and then the joint member 110 must rotated. Thus, in order to permit this motion, the size of the transverse plate 113 is limited so that it is impossible to sufficiently ensure the rigidity of the joining of the wiper arm 10 and the wiper blade main-body 1. As a result, during the operation of the wiper system, harmful vibrations occur between the wiper arm 10 and the wiper blade main-body 1.

In the joint member 120 of FIGS. 19(A) to 19(C), because the joint member 120 is constituted by the two members, that is, the main body 121 and the holding member 122, the manufacturing and assembling of the parts require cost. Further, to avoid interference between the U-hook portion 11 and the holding member 122 when U-hook portion 11 is mounted on the joining member 120, the shape of the U-hook portion 11 and the holding member 122 is limited.

SUMMARY OF THE INVENTION

It is therefore an object of the present invention to provide a joining member capable of easily and firmly joining a wiper arm with U-hook portions of various types to a wiper blade main-body at low cost.

According to the present invention, a joint member used in joining a wiper arm and a wiper blade together, which comprises: a fitting member which is mounted on a wiper blade main-body and fits against the wiper arm; a fixing member which holds and fixes the wiper arm between the fixing member and the fitting member; and a flexible connecting portion which connects the fitting member and the fixing member together.

The fitting member may fit into an inner side of a hook portion provided in the wiper arm and the fixing member may support the hook portion by sandwiching the hook portion between the fixing member and the fitting member.

The fixing member may be a case-like member that covers the fitting member and the hook portion.

The fixing member may include a side portion disposed on a side of the hook portion and a front portion disposed on a front end side of the side portion, whereby a leading end portion of the hook portion may be supported by being sandwiched between the front portion and the fitting member.

The fixing member may include side portions disposed on both sides of the hook portion and a front portion which spans across these side portions, whereby the hook portion may be supported by being sandwiched between the front portion and the fitting member.

The fixing member may support the hook potion by sandwiching the hook portion in such a manner that the side portion abuts against part of the wiper blade main-body.

The fixing member may be rotatably mounted on the wiper blade main-body.

The wiper blade main-body may include a mounting pin which extends orthogonally to the longitudinal direction of the wiper blade and the fitting member may include a mounting portion which rotatably fits on the mounting pin.

The connecting portion may connect the fitting member and the fixing member together at a end of a the joint member.

The connecting portion may connect the fitting member and the fixing member together on a side of the joint member.

The connecting portion may be a plate-like member.

The fixing member, the fitting member and the connecting member may be monolithically molded as one member.

A wiper blade of the present invention includes the joint member of the invention described above.

Because the joint member of the present invention comprises a fitting member (for example, fitting members 21, 51) which is mounted on a wiper blade main-body (for example, a wiper blade main-body 1) and fits against a wiper arm (a wiper arm 10), a fixing member (for example, fixing members 22, 52) which holds and fixes the wiper arm between the fixing member and the fitting member, and a flexible connecting portion (for example, connecting portions 23, 53) which connects the fitting member and the fixing member together, and because, for example, the fitting member fits into an inner side of a hook portion (for example, a U-hook portion 11) provided in the wiper arm and the fixing member supports the hook portion by sandwiching the hook portion between the fixing member itself and the fitting member, the fixing member can relatively freely moving with respect to the fitting member in a range in which the connecting portion is deformed. Therefore, the wiper arm is easily joined to the joint member. Also, because the joining work can be performed by mounting the fixing member on the fitting member and the hook portion, the work can be performed on the upper side of the wiper blade main-body and the worker can perform the joining work easily while visually checking work positions. Also, because the flexible connecting portion holds the hook portion between the fitting member and the fixing member by warping, a simple structure can be obtained in comparison with a case where a complex connecting mechanism is adopted and it is possible to reduce cost. Also, the adaptable shape of the hook portion will not be limited by the connecting structure of the fitting member and the fixing member. Further, because the fitting member and the fixing member can be designed as separate members and the configurations of the fitting member and fixing member will not be limited by the manner of their mutual connection (connecting structure), it is possible to appropriately select the sizes and shapes of the fitting member and fixing member so that a strong holding force is ensured. As a result, it is possible to effectively suppress a vibration between the wiper arm and the wiper blade. It is also possible to appropriately set the rotational resistance of the wiper arm and wiper blade.

By using a plate-like member as the connecting portion, it is ensured that the connecting portion has high durability which hardly causes fracture while providing appropriate flexibility (the property of being easily bent).

By placing a case-like fixing member on the fitting member and the hook portion to cover them and thereby holding the hook portion, the hook portion can be positively held between the fixing member and the fitting member.

When the hook portion is supported by being sandwiched between a front portion (for example, a front transverse plate 41, a front portion 52B) and the fitting member, it is possible to positively fix the hook portion.

When the fixing member supports the hook potion by sandwiching the hook portion in such a manner that the side portion of the fixing member (for example, side plates 42, 43, a side portion 52C) abuts against part of the wiper blade main-body (for example, side portions 2B, 2C), a vibration between the wiper blade and the wiper arm can be effectively suppressed. Further, the wear of the connecting member can also be reduced.

According to the joint member of the present invention, the fixing member, the fitting member and the connecting portion may be monolithically molded as one member, and therefore, the functions which have hitherto been structurally achieved by two parts can be achieved with one part.

BRIEF DESCRIPTION OF THE DRAWINGS

FIG. 5(A) is a left side view of a joint member of a wiper blade in an embodiment of the present invention;

FIG. 5(B) is a right side view of a joint member of a wiper blade in an embodiment of the present invention;

DETAILED DESCRIPTION OF THE PREFERRED EMBODIMENTS

The embodiments of the present invention will be described below by referring to the accompanying drawings.

Figure 1:
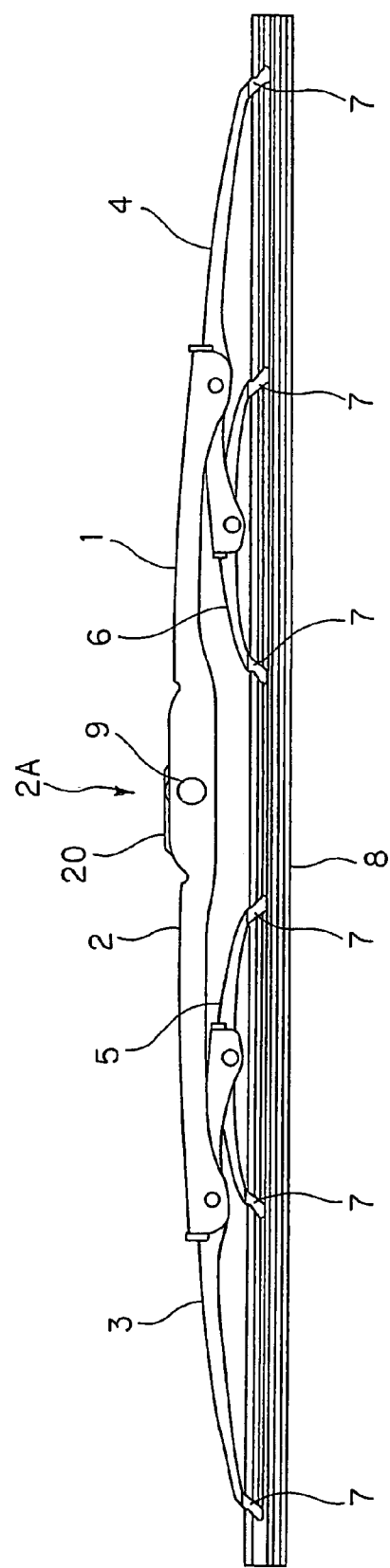
FIG. 1 is a front view of the general construction of a wiper blade in an embodiment of the present invention.
Figure 2:
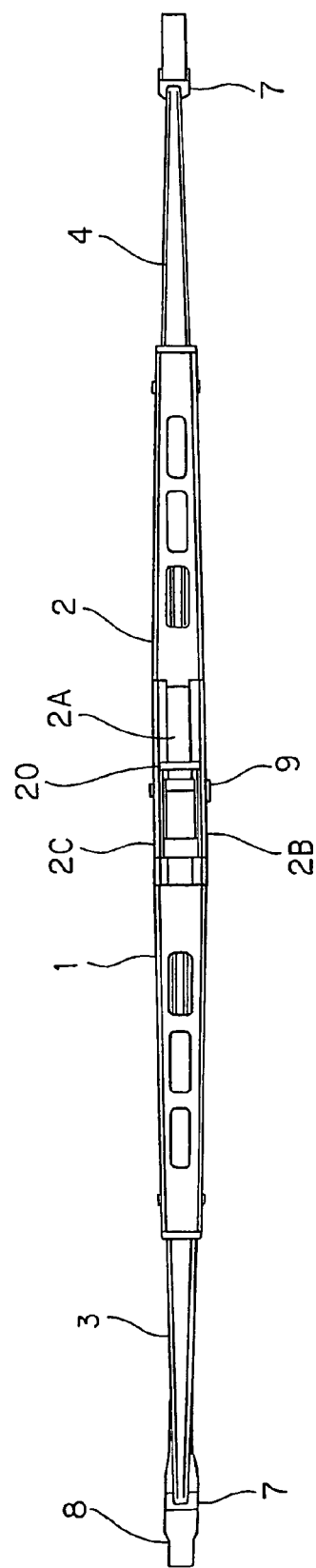
FIG. 2 is a plan view of the general construction of a wiper blade in an embodiment of the present invention.

The general construction of a wiper blade is shown in FIGS. 1 and 2. As shown in the drawings, the wiper blade includes a wiper blade main-body 1 and a joint member 20 to connect this wiper blade main-body 1 and a wiper arm 10 (refer to FIGS. 6(A) to 6(E) etc.) together.

The wiper blade main-body 1 includes a primary lever 2, secondary levers 3, 4 which are rotatably supported on both ends of this primary lever 2, and yoke levers 5, 6 which are rotatably supported on inner side ends of a corresponding secondary levers 3, 4. Supporting claws 7 are formed on the outer side ends of the secondary levers 3, 4 and on both ends of the yoke levers 5, 6, and a wiper rubber 8 is attached to these supporting claws 7.

An opening 2A is formed substantially in the middle portion of the primary lever 2, and a mounting pin 9 spans across side portions 2B, 2C on both sides of this opening 2A. The joint member 20 is mounted on this mounting pin 9.

The wiper arm 10 is connected to the wiper blade main-body 1 through the joint member 20, and also is connected to a motor (not shown) through a link member (not shown). The wiper system is constituted by the wiper blade, wiper arm 10, link member and motor. In the wiper system, the wiper blade is driven by the motor via the link member and the wiper arm 10 and moves along a surface to be wiped (for example, a window glass surface). As a result, the surface to be wiped is wiped by a wiper rubber 8.

Figure 3:
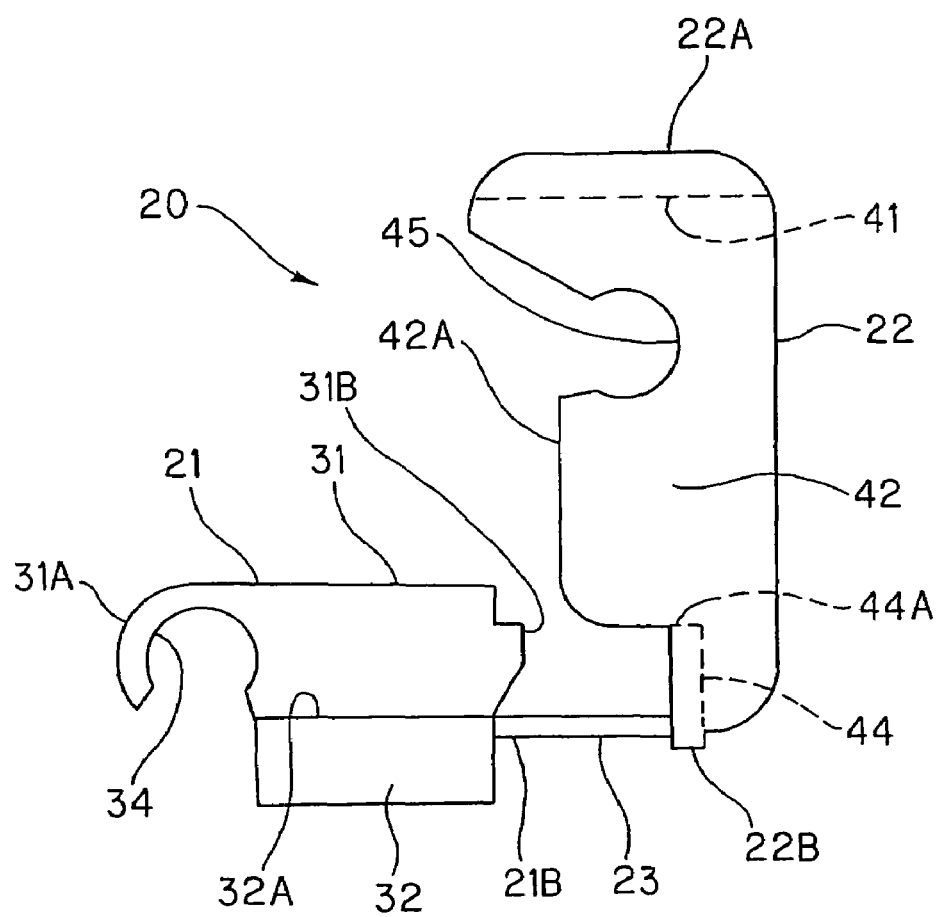
FIG. 3 is a front view of a joint member of a wiper blade in an embodiment of the present invention.
Figure 4:
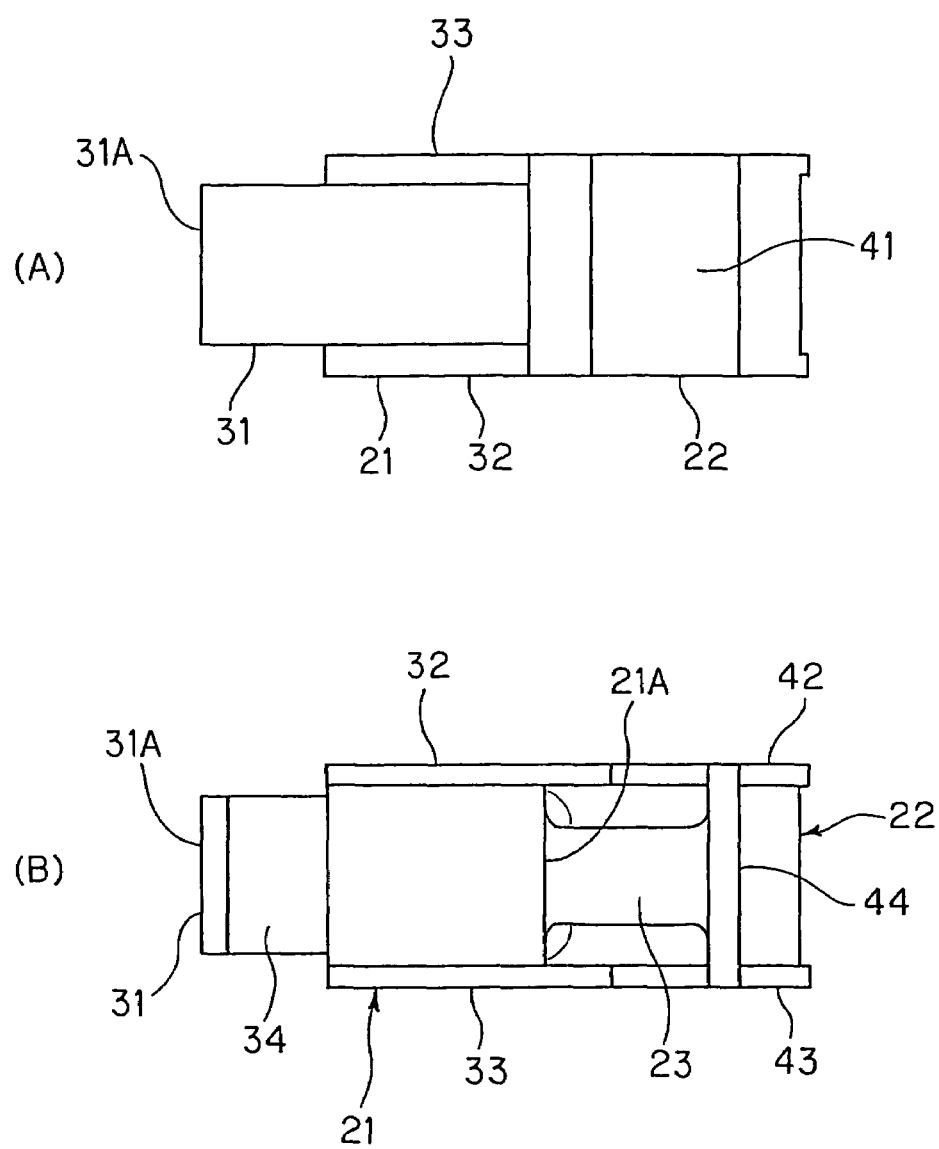
FIG. 4(A) is a plan view of a joint member of a wiper blade in an embodiment of the present invention.
FIG. 4(B) is a bottom view of a joint member of a wiper blade in an embodiment of the present invention.

The joint member 20 is shown in detail in FIG. 3 to FIGS. 5(A) and 5(B). The joint member 20 shown in FIG. 3 to FIGS. 5(A) and 5(B) is in a non-joined condition. FIG. 3 shows a side view of the joint member 20. FIGS. 4(A) and 4(B) show a plan view and a bottom view of the joint member 20, respectively. FIGS. 5(A) and 5(B) show a front view and a rear view of the joint member 20, respectively.

As shown in the drawings, the joint member 20 includes the fitting member 21 which fits to the U-hook portion 11 of the wiper arm 10 (not shown in FIG. 3 to FIGS. 5(A) and 5(B)), the fixing member 22 which supports and fixes the U-hook portion 11 by sandwiching the U-hook portion between the fixing member itself and the fitting member 21, and the connecting portion 23 which connects the fitting member 21 and the fixing member 22 together. The fitting member 21, the fixing member 22 and the connecting member 23 are formed as one member by the monolithic molding of plastics.

The fitting member 21 includes a main-body portion 31 which the U-hook portion 11 of the wiper arm 10 fits to, and side plates 32, 33 which extend downward from both ends of the main-body portion 31. A front end 31A of the main-body portion 31 has the shape of a circular arc which fits the shape of the U-hook portion 11. A mounting hole 34 having a section of a circular arc on the lower side of the side of the front end 31A of the main-body portion 31. In this mounting hole 34, the joint member 20 is rotatably mounted on the mounting pin 9 of the wiper blade main-body 1.

The fixing member 22 is a case-like member capable of being mounted on the upper side of the fitting member 21 in order to fix the U-hook portion 11, and includes a front transverse plate 41 disposed at the front end 22A, side plates 42, 43 disposed on both sides, and a rear transverse plate 44 disposed near a rear end 22B. The front transverse plate 41 is disposed substantially perpendicular to the longitudinal direction of the fixing member 22 in the front end portion corresponding to the width of the side plates 42, 43. On the other hand, the rear plate 44 is disposed so as to extend in the longitudinal direction of the fixing member 22 in the rear end portion of the side plates 42, 43. Mounting holes 45, 46 are formed on the lower side of each of the side plates 42, 43. Each of the mounting holes 45, 46 has a recess in the form of a circular arc. The mounting pin 9 of the wiper blade main-body fits into the mounting holes 45, 46.

To fix the U-hook portion 11 (during joining), the side plates 42, 43 are arranged so as to sandwich the main-body portion 31 from both sides. Lower ends 42A, 43A of the two side plates 42, 43 abut against upper ends 32A, 33A of a corresponding two side plates 32, 33, respectively. A front end 44A of the rear transverse plate 44 abuts against a rear end 31B of the main-body portion 31 so that the fitting member 21 and the fixing member 22 are accurately positioned in the longitudinal direction. Thus, the mounting hole 34 of the fitting member 21 and the mounting holes 45, 46 of the fixing member 22 are disposed in an accurately superposed position. Further, the front transverse plate 41 is disposed with respect to the front end 31A of the fitting member main-body portion 31 with a gap corresponding to the thickness of the U-hook portion 11. As a result, the U-hook portion 11 is supported by being sandwiched between the front transverse plate 41 and the front end 31A so as to ensure positive fixing of the U-hook portion 11.

The connecting portion 23 is a flexible plate-like member, extends perpendicular to the two side plates 32, 33 of the fitting member 21 and the two side plates 42, 43 of the fixing member 22, and connects the rear end 21B of the fitting member 21 and the rear end 22B of the fixing member 22 together. The connecting portion 23 can warp in an arbitrary direction with respect to the plane thereof. As a result, the fitting member 21 and the fixing member 22 can move mutually at the range which is allowed by the flexibility of the connecting portion 23.

Concretely, in an initial condition (a nonjoined condition) wherein the fitting member 21 and the fixing member 22 are not used for joining of the wiper blade main-body 1 and the wiper arm 10, the fitting member 21 and the fixing member 22 are arranged in such a manner that the mutual longitudinal directions have an angle of about 90 degrees as shown in FIG. 3 to FIGS. 5(A) and 5(B). In contrast, during the joining of the wiper blade main-body 1 and the wiper arm 10, the fitting member 21 and the fixing member 22 are arranged in a superposed condition so that the mutual longitudinal directions are substantially parallel to each other (refer to FIG. 6(E)).

The process of joining the wiper blade main-body 1 and the wiper arm 10 together by use of the joint member 20 will be described below by referring to FIGS. 6(A) to 6(E), FIG. 7 to FIG. 11.

Figure 6:
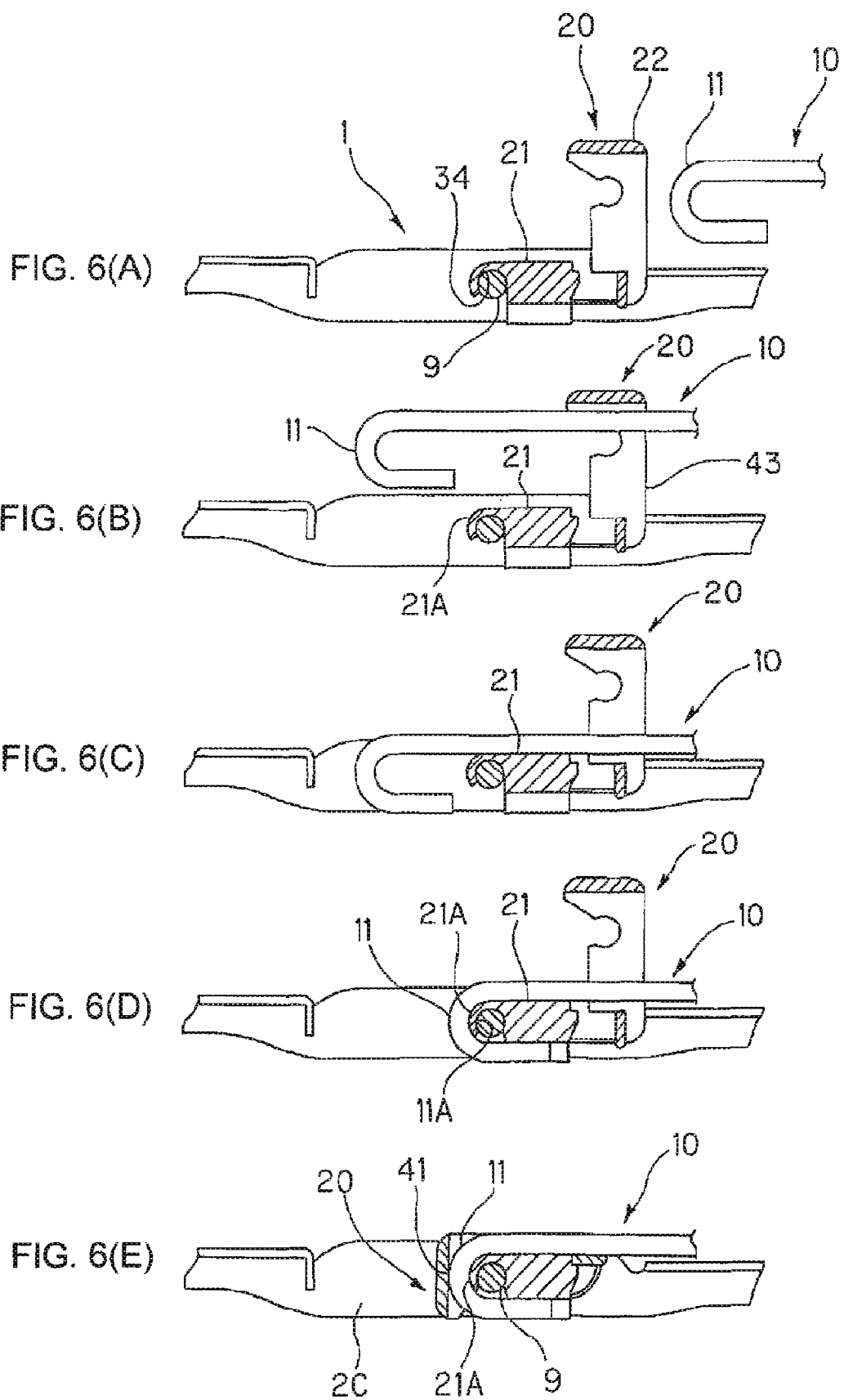
FIGS. 6(A) to 6(E) are each a view showing how to mount a wiper arm on a wiper blade main-body using a joint member of a wiper blade in an embodiment of the present invention.
Figure 7:
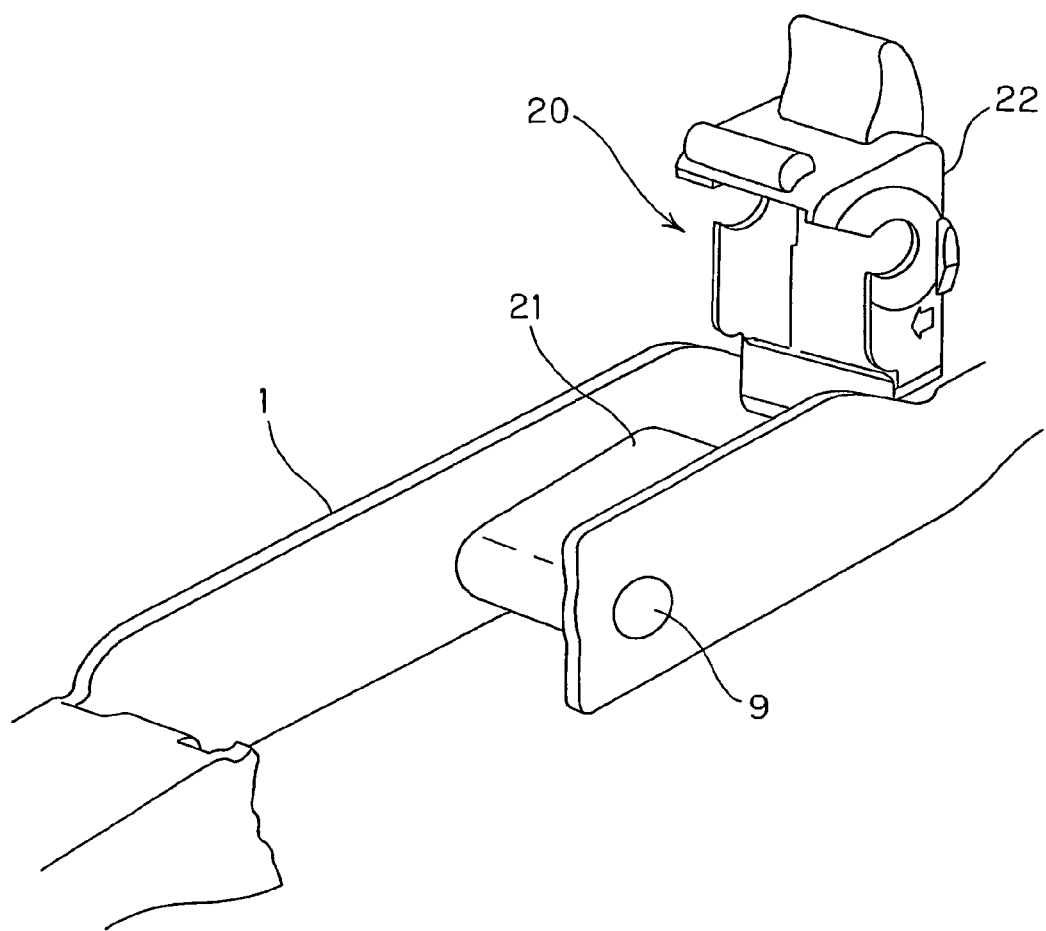
FIG. 7 is a perspective view showing how to mount a wiper arm on a wiper blade main-body using a joint member of a wiper blade in an embodiment of the present invention.
Figure 8:
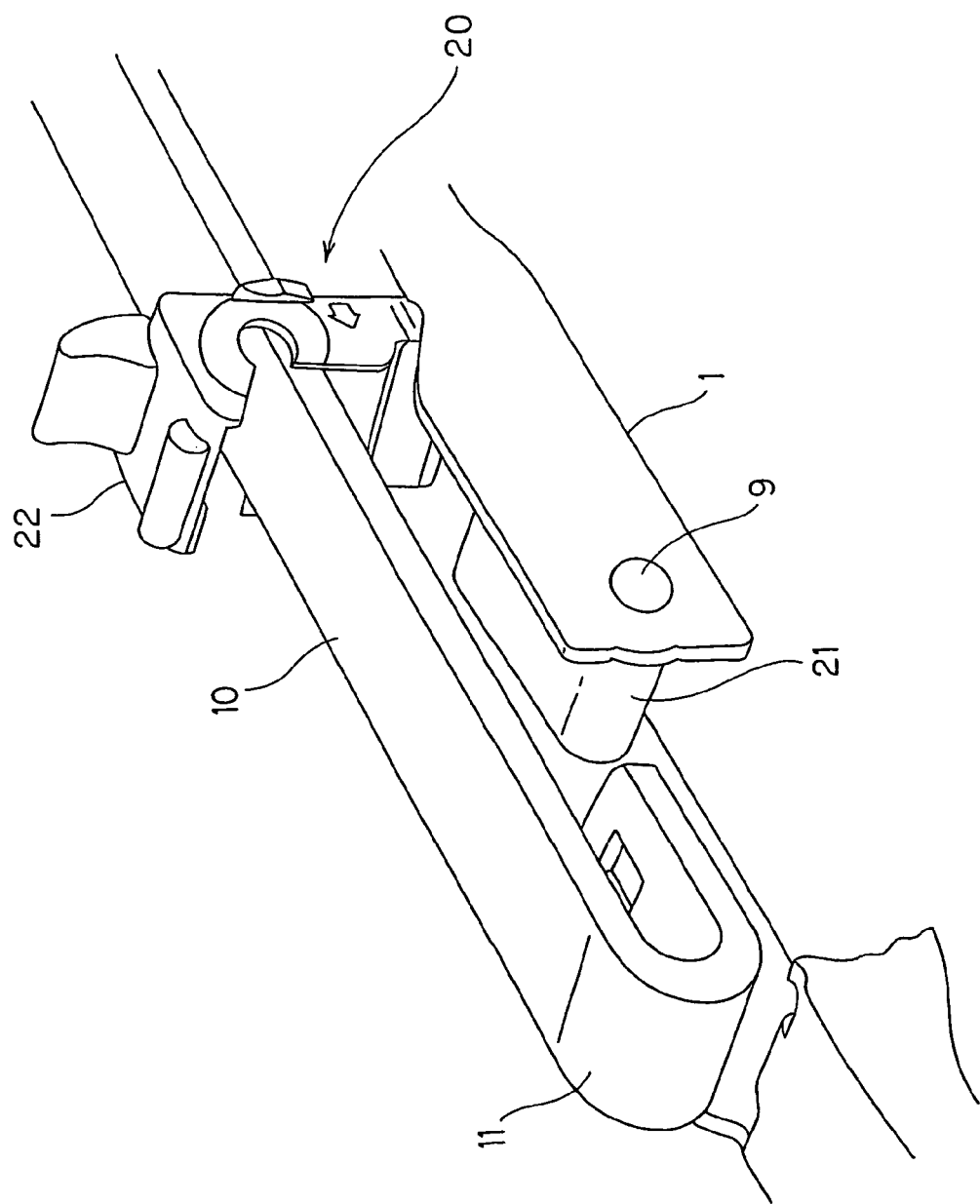
FIG. 8 is a perspective view showing how to mount a wiper arm on a wiper blade main-body using a joint member of a wiper blade in an embodiment of the present invention.

As shown in FIG. 6(A) and FIG. 7, the mounting pin 9 of the wiper blade main-body 1 is fitted into the mounting hole 34 of the fitting member 21. Then, as shown in FIG. 6(B) and FIG. 8, the U-hook portion 11 at the front end of the wiper arm 10 is brought to a position before the front end 21A of the main-body portion 21 through a gap between the side plates 42 and 43. The joint member 20 can rotate around the mounting pin 9. Thus, during mounting work, the angle between the wiper arm 10 and the wiper blade main-body 1 can be changed freely.

Figure 9:
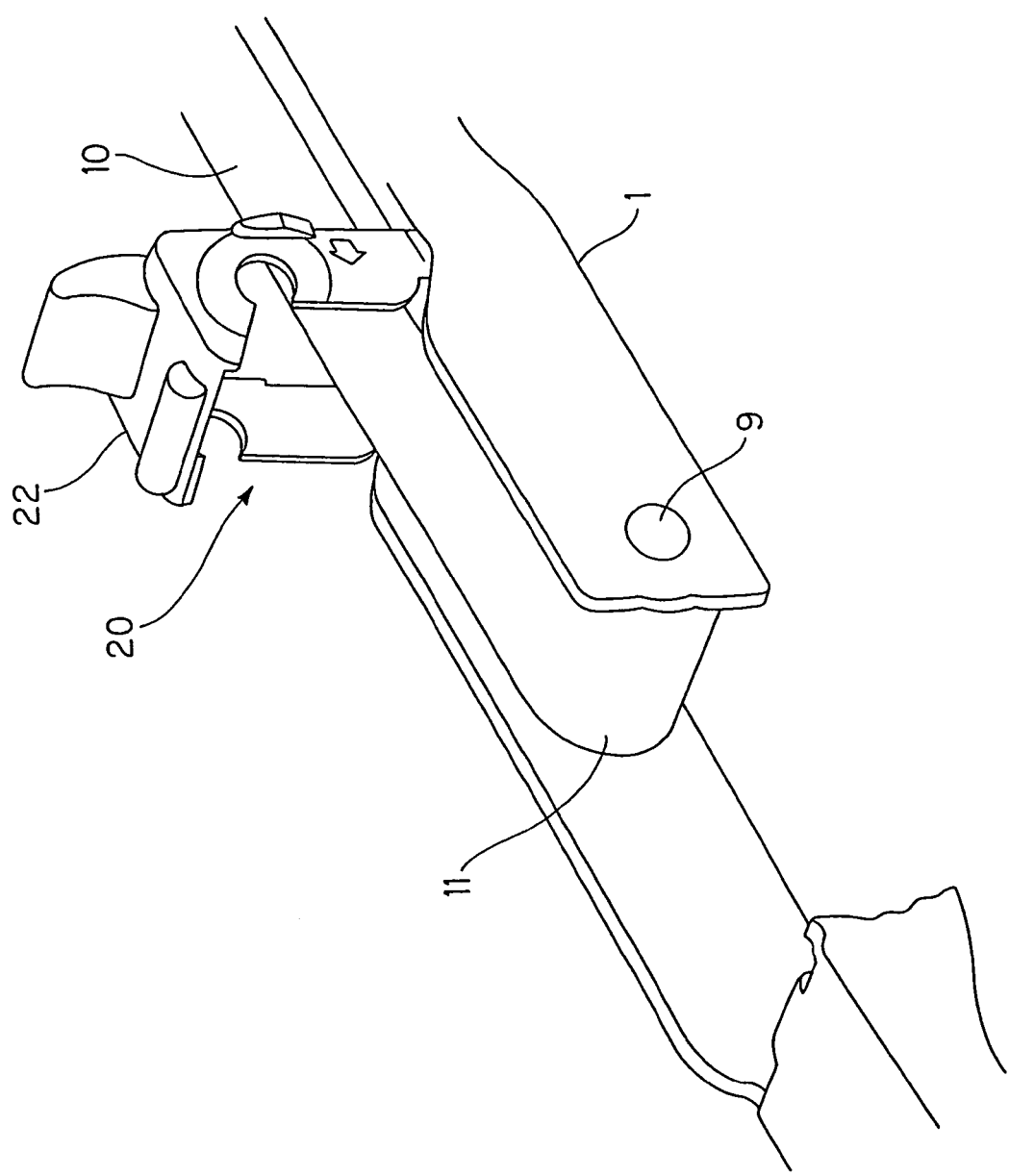
FIG. 9 is a perspective view showing how to mount a wiper arm on a wiper blade main-body using a joint member of a wiper blade in an embodiment of the present invention.

As shown in FIG. 6(C) and FIG. 9, the wiper arm 10 is moved to abut against the top surface of the main-body portion 21. And as shown in FIG. 6(D), the wiper arm 10 is moved backward until the front end 21A of the main-body portion 21 abuts against the innermost recess of the U-hook portion 11. As a result, the main-body portion 21 of the fitting member 21 fits into the U-hook portion 11.

Figure 10:
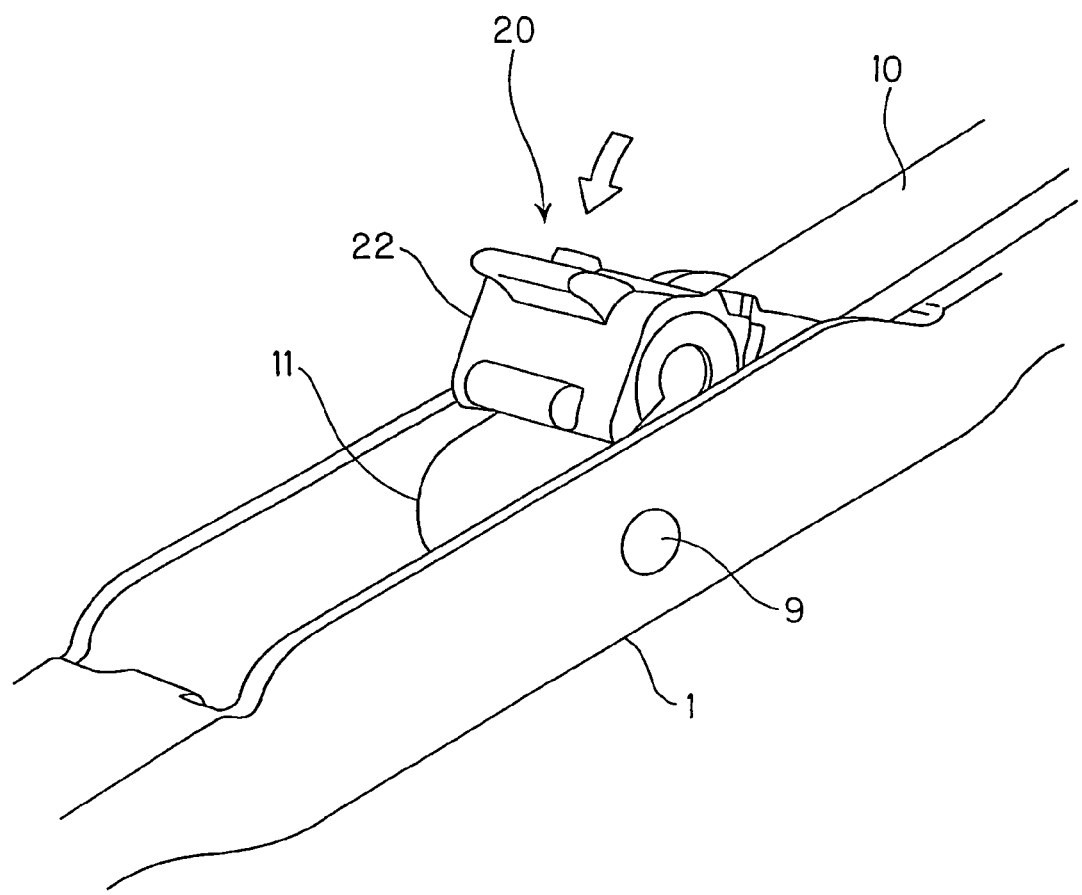
FIG. 10 is a perspective view showing how to mount a wiper arm on a wiper blade main-body using a joint member of a wiper blade in an embodiment of the present invention.
Figure 11:
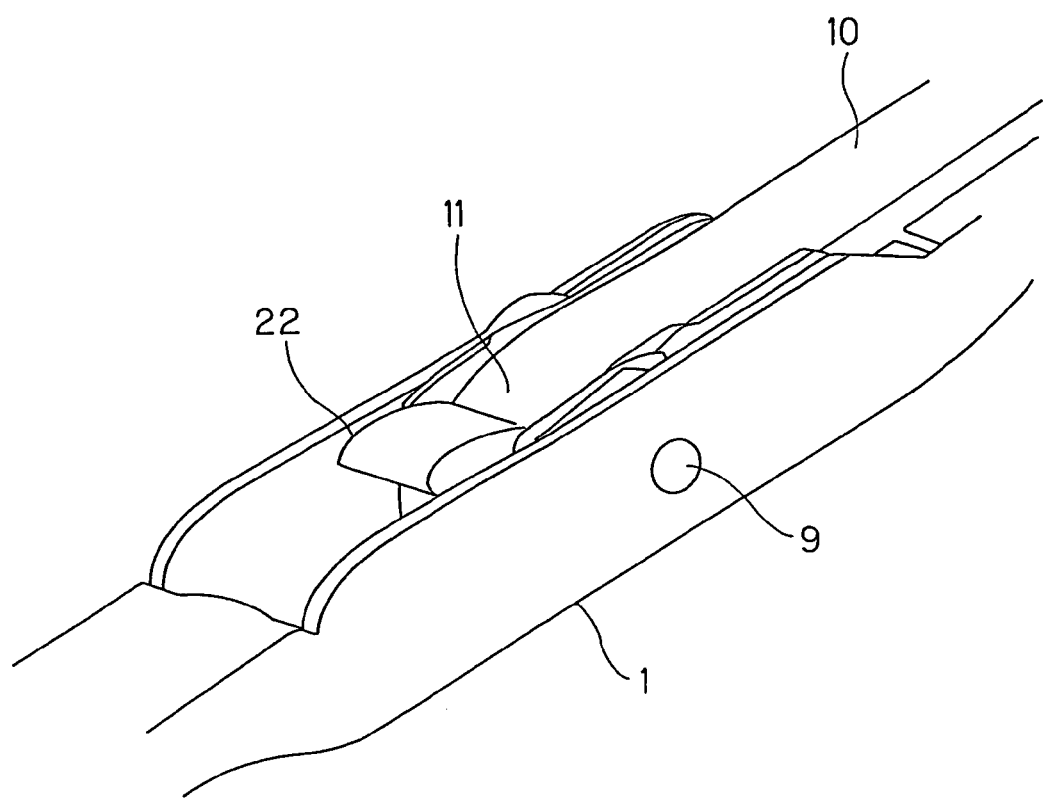
FIG. 11 is a perspective view showing how to mount a wiper arm on a wiper blade main-body using a joint member of a wiper blade in an embodiment of the present invention.
Figure 12:
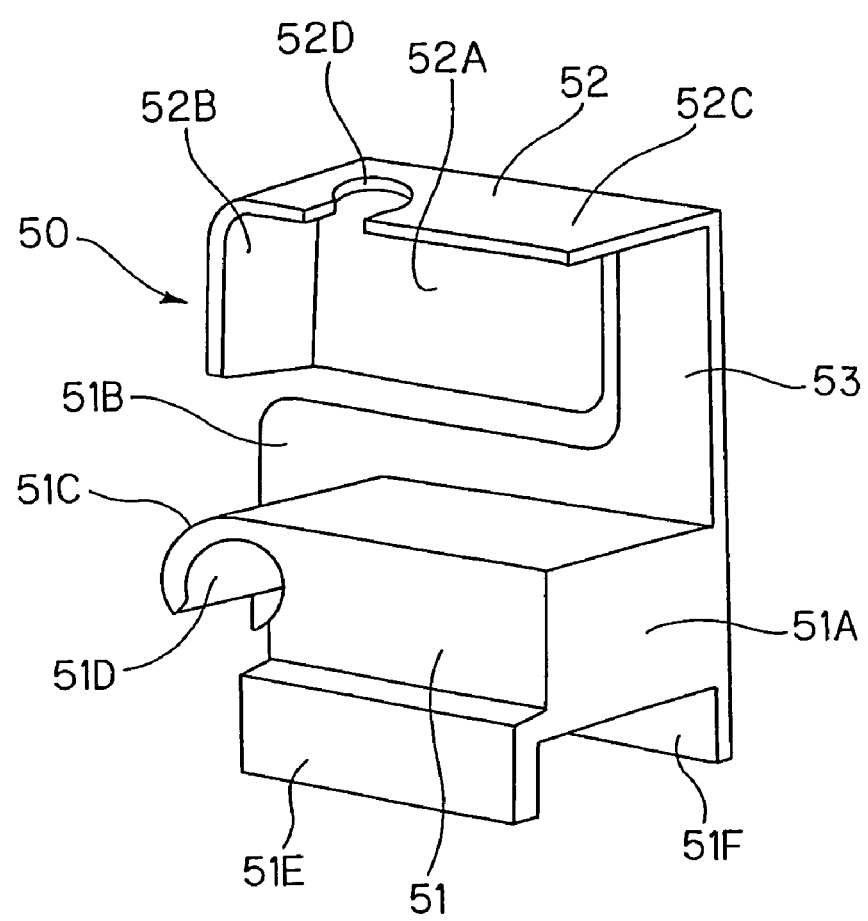
FIG. 12 is a perspective view of a joint member in another embodiment of the present invention.
Figure 13:
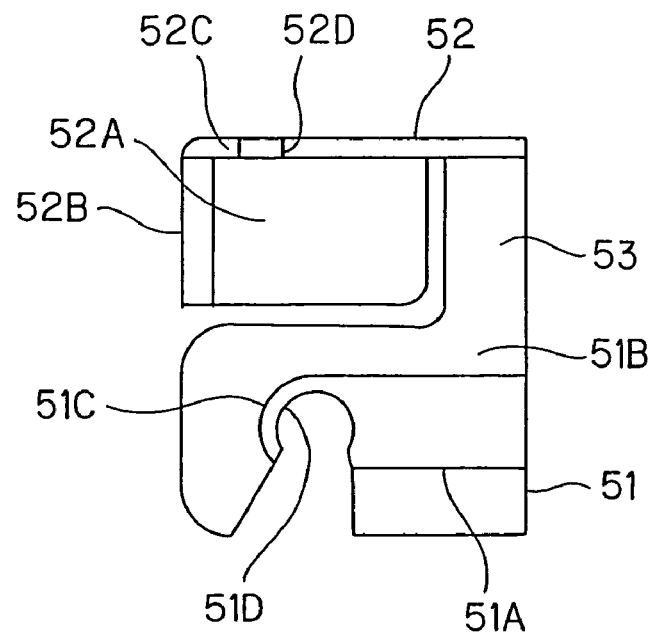
FIG. 13 is a front view of a joint member in another embodiment of the present invention.
Figure 14:
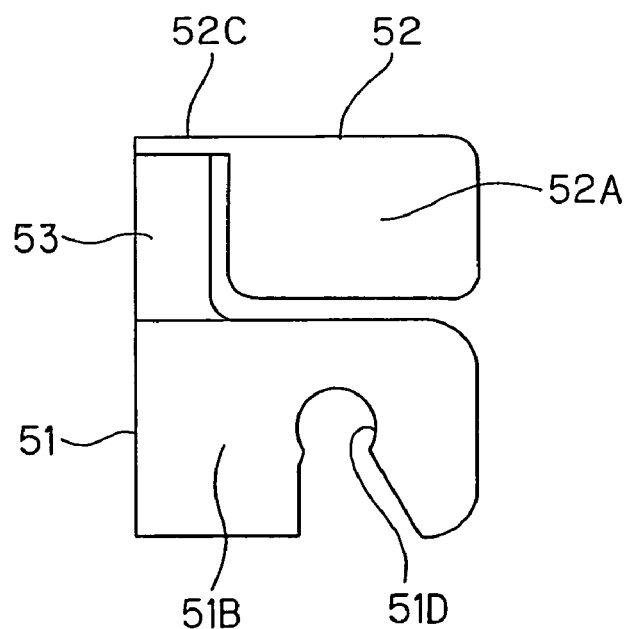
FIG. 14 is a rear view of a joint member in another embodiment of the present invention.
Figure 15:
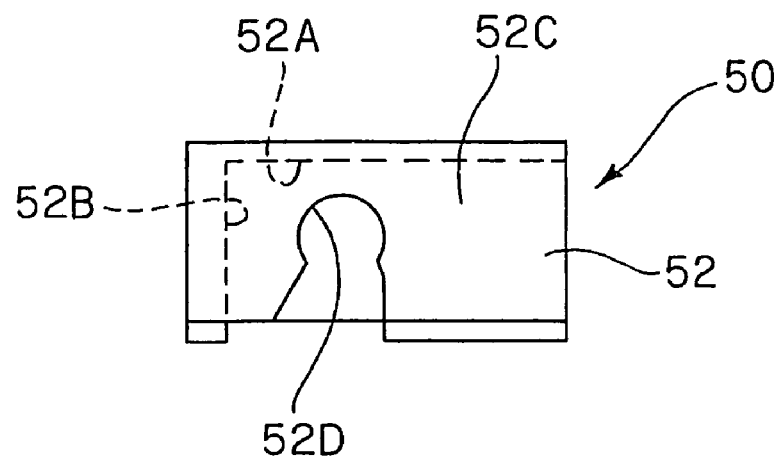
FIG. 15 is a plan view of a joint member in another embodiment of the present invention.
Figure 16:
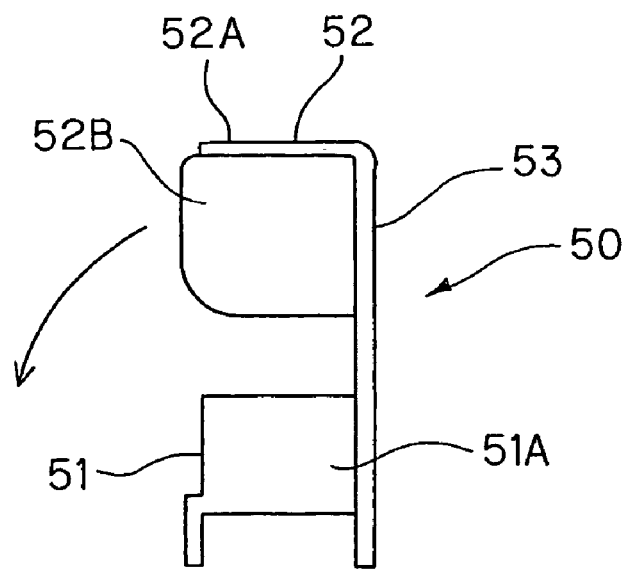
FIG. 16 is a right side view of a joint member in another embodiment of the present invention.
Figure 17A:
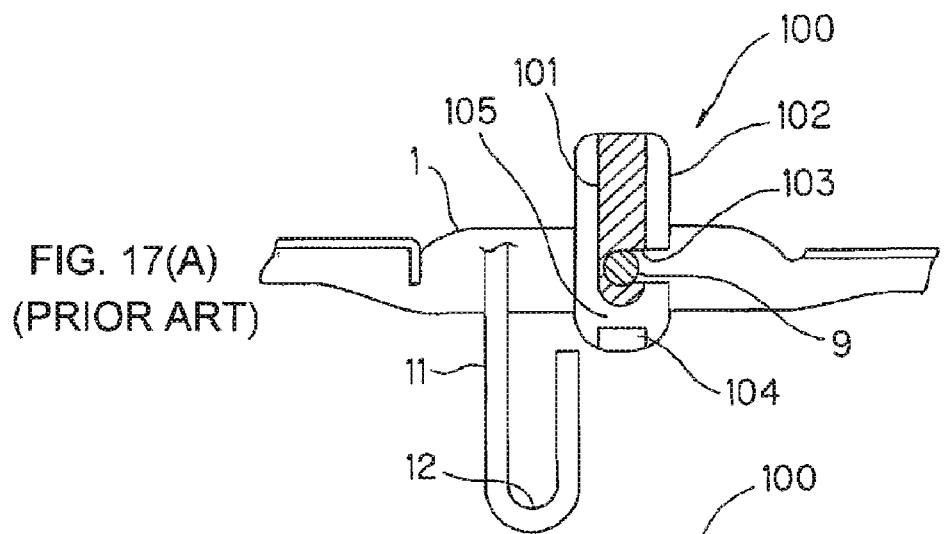
FIGS. 17(A) to 17(D) are views to explain the mounting of a wiper arm on a wiper blade main-body using a conventional joint member.
Figure 17B:
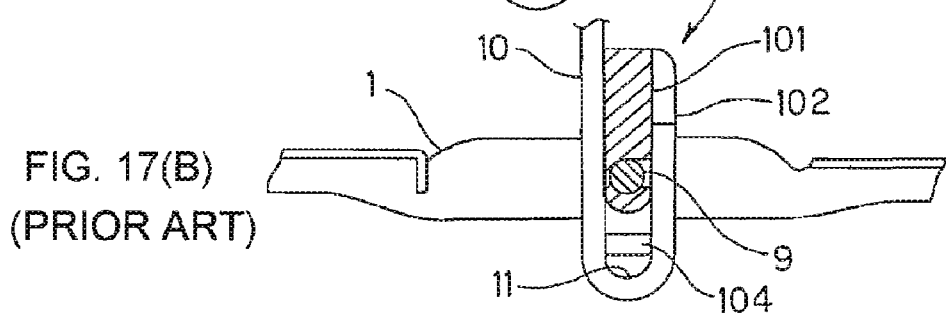
Figure 17C:
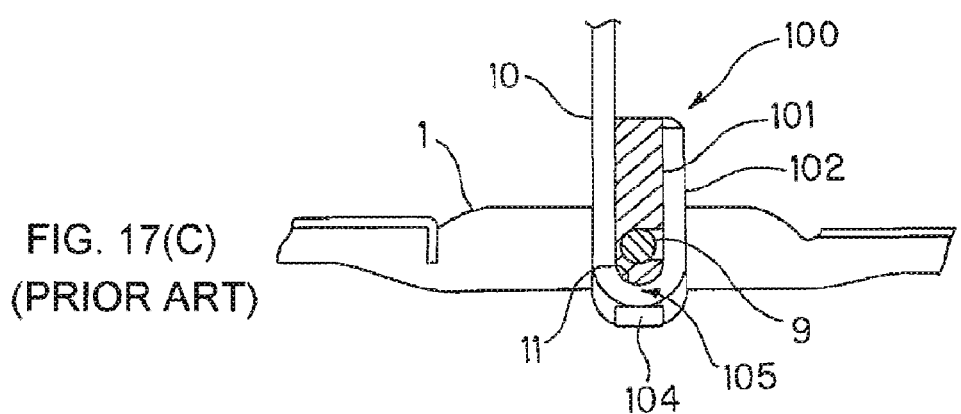
Figure 17D:
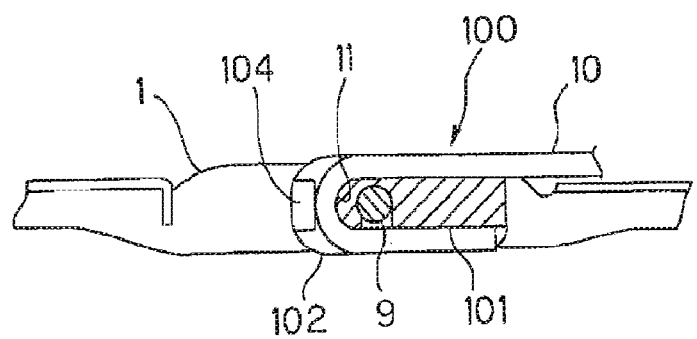
Figures 18A, 18B, 18C, 18D:
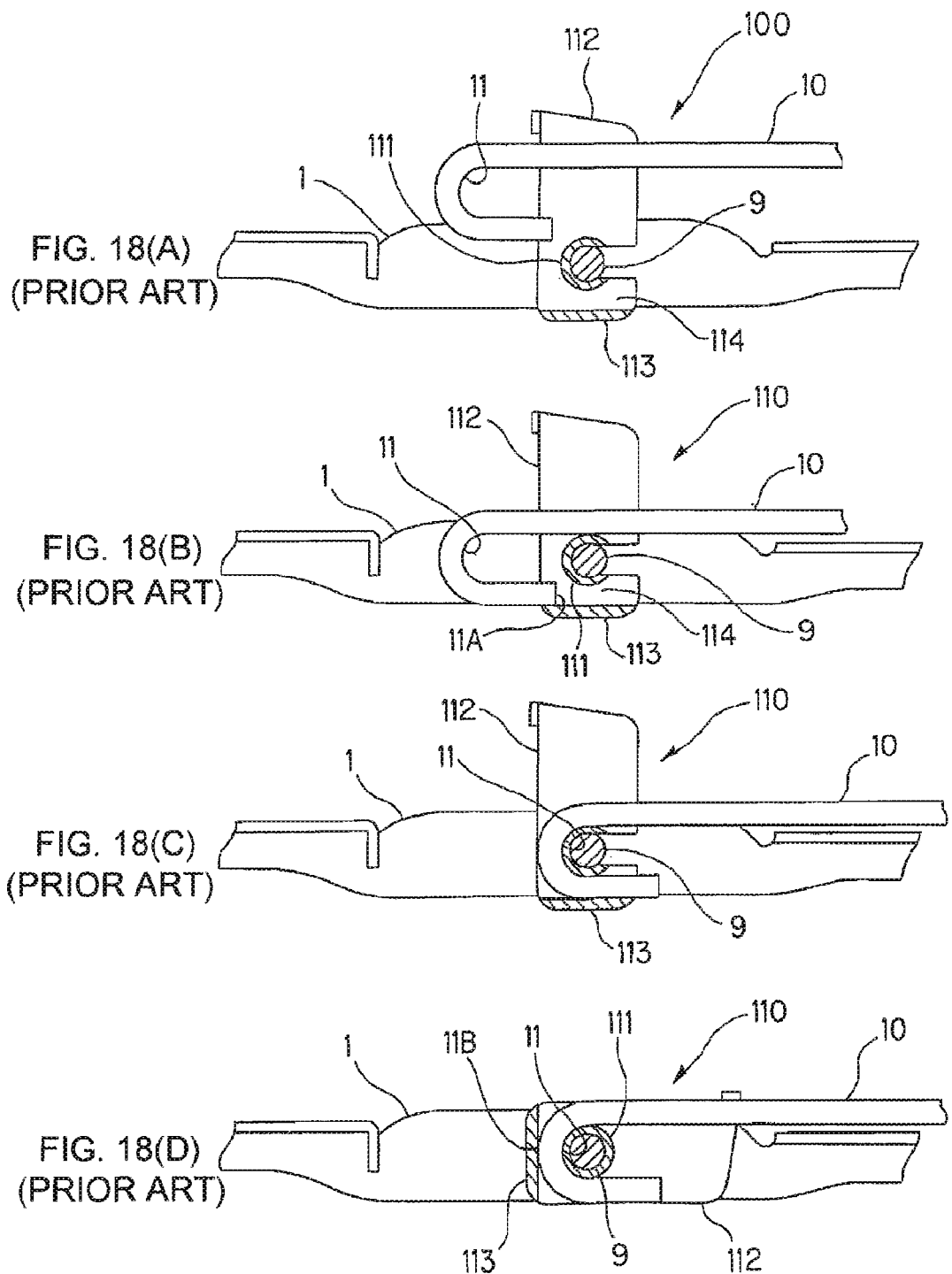
FIGS. 18(A) to 18(D) are views to explain the mounting of a wiper arm on a wiper blade main-body using another conventional joint member.
Figure 19A:
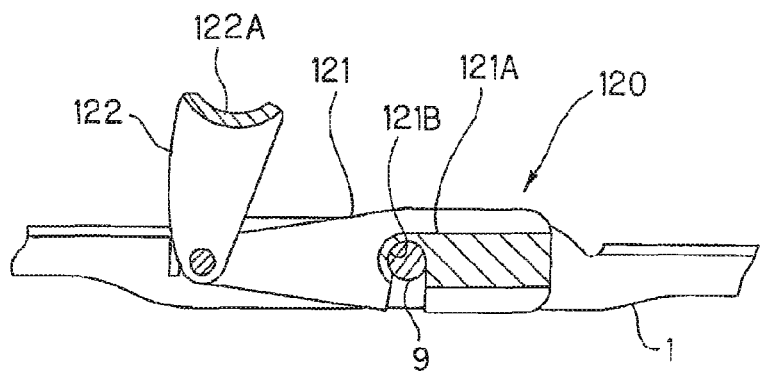
FIGS. 19(A) to 19(C) are views to explain the mounting of a wiper arm on a wiper blade main-body using a further conventional joint member.
Figure 19B:
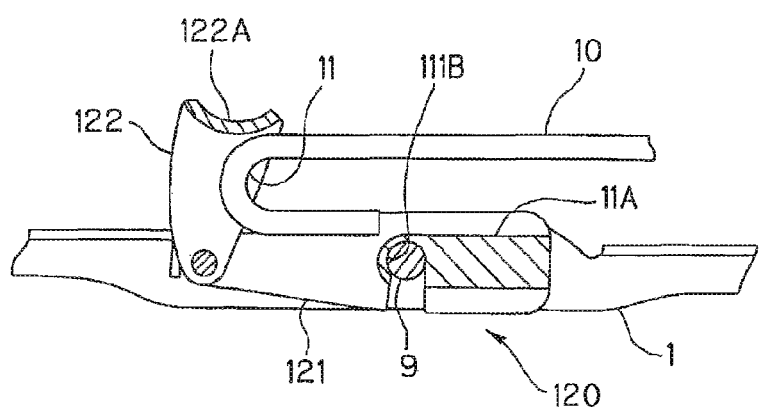
Figure 19C:
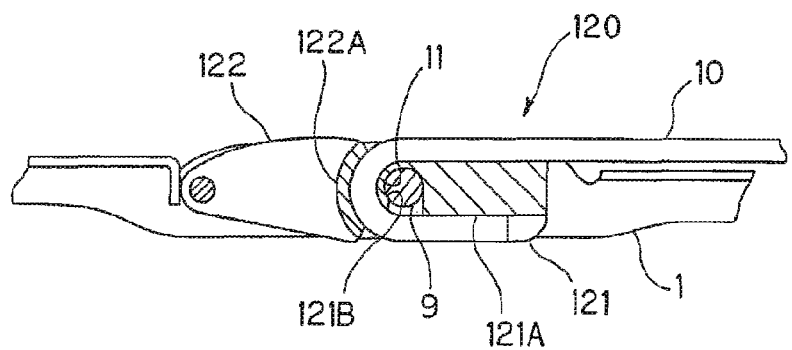

As shown in FIG. 10, the fixing member 22 is rotated about 90 degrees to cover the fitting member 21 and the U-hook portion 11. As a result, as shown in FIG. 6(E) and FIG. 11, the U-hook portion 11 is sandwiched between the front end 21A of the main-body portion 21 and the front transverse plate 41 of the fixing member 22 and fixed.

As described above, according to the joint member 20 of this embodiment, the fitting member 21 and the fixing member 22 are joined together by the connecting portion 23 capable of being deformed. Therefore, in joining work, the positional relationship between the fitting member 21 and the fixing member 22 can be relatively freely moved in the range of the deformation of the connecting portion 23 and joining work becomes easy.

Further, because joining work can be performed by mounting the fixing member 22 on the fitting member 21 and the U-hook portion 11, the work can be performed in an area near the upper side of the wiper blade main-body 1 (the opposite side to the wiper rubber 8). Thus, the worker can easily perform the joining work while visually checking work positions.

Also, because the connecting portion 23 holds the U-hook portion 11 between the fitting member 21 and the fixing member 22 by warping, a simple structure can be obtained and it is possible to substantially reduce cost in comparison with a case where a complex connecting mechanism is adopted. Also, the adaptable shape of the U-hook portion 11 will not be limited by the connecting structure of the fitting member 21 and the fixing member 22.

Further, because the fitting member 21 and the fixing member 22 can be designed as separate members and the configurations of the fitting member 21 and fixing member 22 will not be limited by the manner of their mutual connection (connecting structure), it is possible to appropriately select the sizes and shapes of the fitting member 21 and fixing member 22 so that a strong holding force is ensured. As a result, it is possible to effectively suppress a vibration between the wiper arm 10 and the wiper blade, and it is possible to appropriately set the rotational resistance of the wiper arm 10 and wiper blade.

Because the connecting portion 23 is a plate-like member, it is ensured that the connecting portion has high durability and is less apt to fracture in use while providing appropriate flexibility.

Because the fixing member 21 is a case-like member which is placed on the fitting member 21 and the hook portion 11 to cover them, the hook portion 11 can be positively held between the fixing member 22 and the fitting member 21. In this case, because the hook portion 11 is supported between the front transverse plate 41 of the fixing member and the front end 21A of the fitting member 21A, the hook portion 11 can be positively fixed.

Because the two side plates 42, 43 of the fixing member 22 which holds the hook portion 11 abut against part of the side portions 2B, 2C) of the wiper blade main-body 1, a vibration between the wiper blade and the wiper arm 10 can be effectively suppressed. Further, as a result, the wear of the connecting member 20 can also be reduced.

Also, because the fitting member 21 is rotatable around the joining pin 10 with respect to the wiper blade main-body 1, the angles of the wiper arm 10 and wiper blade main-body 1 during joining work can be changed so as to facilitate the work according to the kinds of the wiper blade 1 and wiper arm 10.

Further, in the joint member 20, the fixing member 21, the fitting member 22 and the connecting portion 23 are monolithically integrally molded as one member, and therefore, the functions which have hitherto been structurally achieved by two parts can be achieved with one part.

A joint member 50 in another embodiment of the present invention is shown in FIG. 12 to FIG. 16. The joint member 50 is used in joining the wiper blade main-body 1 and the wiper arm 10 in the same manner as with the joint member 20 of the above-described embodiment.

As shown in the figures, the joint member 50 includes a fitting member 51 which fits into a U-hook portion of a wiper arm 10, and a fixing member 52 which supports the U-hook portion 11 by sandwiching the U-hook portion between the fixing member itself and the fitting member 51, and a connecting portion 53 which connects the fitting member 51 and the fixing member 52. The construction of the joint member 50 is such that the connecting of the fitting member 51 and the fixing member 52 by this connecting portion 53 is performed on the sides of the joint member 50, and in this respect, the joint member 50 differs from the above-described joint member 20.

Specifically, the fitting member 51 is provided with a main-body portion 51A which fits to the inner side of the U-hook portion 11 and a side portion 51B provided on one side of this main-body portion 51A. A front end 51C of the main-body portion 51A has the shape of a circular arc which matches the shape of a recess of the U-hook portion 11. A mounting hole 51D in the shape of a circular arc is formed on the lower side of the front end 51C of the main-body portion 51A. A mounting pin 9 of the wiper blade main-body 1 fits into this mounting hole 51D. Lower side plates 51E, 51F are provided on the lower side of the fitting member 51, and the front end side of the U-hook portion 11 which moves round below the main-body portion 51A is held between the lower side plates 51E, 51F.

The fixing member 52 is a case-like member which is mounted on the upper side of the fitting member 21 in order to fix the U-hook portion 11 and comprises a top portion 52A, a front portion 52B and a side portion 52C for holding the U-hook portion between the fitting member 51 and the top face. In the side portion 52C, a mounting hole 52D is formed in a position corresponding to the mounting hole 51D of the fitting member 51, and has a recess in the shape of a circular arc. The mounting pin 9 of the wiper blade main-body 1 fits into this mounting hole 52D.

The connecting portion 53, which is a flexible plate-like member, connects the side portion 51B of the fitting member 51 and the side portion 51C of the fixing member 52 on one side of the joint member 50. The fitting member 51, the fixing member 52 and the connecting portion 53 are monolithically molded from plastics, for example.

In joining the wiper arm 10 and the wiper blade main-body 1, the U-hook portion 11 is fitted to the outer side of the main-body portion 51A of the fitting member 51, and the mounting hole 51D is fitted to the mounting pin 9. Then, the connecting portion 53 is bent and the fixing member 53 is sideways placed on the U-hook portion 11 and the fitting member 51 to cover them. At this time, the mounting pin 9 fits into the mounting hole 52D of the fixing member 53, the position of the fixing member 53 is fixed, and the U-hook portion 11 is firmly held between the fitting member 51 and the fixing member 52. The two sides of the U-hook portion 11 are held by the side portion 51B of the fitting member 51 and the side plate 52C of the fixing member.

As described above, in the present invention, the connecting position where the fitting member and the fixing member is connected through the connecting portion can be changed. The connecting portion can be provided in an arbitrary place.

The invention claimed is:

1. A joint member used in joining a wiper arm and a wiper blade together, comprising:
   a fitting member which is mounted on a wiper blade main-body and fits to the wiper arm;
   a fixing member which holds and fixes the wiper arm between the fixing member and the fitting member; and
   a flexible connecting portion which connects the fitting member and the fixing member together,
   the fitting member being adapted to fit into an inner side of a hook portion provided in the wiper arm, and the fixing member being adapted to support the hook portion by sandwiching the hook portion between the fixing member and the fitting member,
   the fixing member being a case-like structure adapted to be mounted on the upper sides of the fitting member and the hook portion to cover the fitting member and the hook portion,
   the fixing member including a side portion adapted to be disposed on a side of the hook portion and a front portion disposed on a front end side of the side portion, and thereby a leading end portion of the hook portion can be supported by being sandwiched between the front portion and the fitting member,
   the wiper blade main-body including a mounting pin that extends orthogonally to the longitudinal direction of the wiper blade, and
   the side portion of the fixing member including a mounting hole for receiving the mounting pin,
   wherein the connecting portion connects the fitting member and the fixing member together at an end portion of the joint member.

2. A joint member according to claim 1, wherein the hook portion is supported by being sandwiched between the front portion of the fixing member and the fitting member.

3. A joint member according to claim 1, wherein the fixing member supports the hook potion by sandwiching the hook portion in such a manner that the side portion of the fixing member abuts against a part of the wiper blade main-body.

4. A joint member according to claim 1, wherein the fixing member is rotatably mounted on the wiper blade main-body.

5. A joint member according to claim 4, wherein the fitting member includes a mounting portion which is adapted to fit rotatably on the mounting pin.

6. The joint member according to claim 1, wherein the connecting portion is a plate-like member.

7. The joint member according to claim 1, wherein the fixing member, the fitting member and the connecting member are monolithically molded as one member.

8. A wiper blade including a wiper blade main body and a joint member for connecting the wiper blade to a wiper arm, the joint member comprising:
   a fitting member mounted on the wiper blade main-body and having a main body portion adapted to be fit to the wiper arm;
   a fixing member which holds and fixes the wiper arm between the fixing member and the fining member; and
   a flexible connecting portion which connects the fitting member and the fixing member together,
   the fitting member being adapted to fit into an inner side of a hook portion provided in the wiper arm, and the fixing member being adapted to support the hook portion by sandwiching the hook portion between the fixing member and the fitting member,
   the fixing member being a case-like structure adapted to be mounted on the upper sides of the fitting member and the hook portion to cover the fitting member and the hook portion,
   the fixing member including a side portion adapted to be disposed on a side of the hook portion and a front portion disposed on a front end side of the side portion, and thereby a leading end portion of the hook portion can be supported by being sandwiched between the front portion and the fitting member,
   the wiper blade main-body including a mounting pin that extends orthogonally to the longitudinal direction of the wiper blade, and
   the side portion of the fixing member including a mounting hole for receiving the mounting pin,
   wherein the connecting portion connects the fitting member and the fixing member together at an end portion of the joint member.

* * * * *